United States Patent
Brown et al.

(10) Patent No.: US 11,068,361 B2
(45) Date of Patent: *Jul. 20, 2021

(54) CLUSTER FILE SYSTEM SUPPORT FOR EXTENDED NETWORK SERVICE ADDRESSES

(71) Applicant: International Business Machines Corporation, Armonk, NY (US)

(72) Inventors: William B. Brown, Austin, TX (US); Poornima Gupte, Pune (IN); Frank Marschollek, Mainz (DE); Lance W. Russell, Rosanky, TX (US); Rainer Wolafka, Mainz (DE); Rong Zeng, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/676,283

(22) Filed: Nov. 6, 2019

(65) Prior Publication Data

US 2020/0073767 A1 Mar. 5, 2020

Related U.S. Application Data

(63) Continuation of application No. 15/683,629, filed on Aug. 22, 2017, now Pat. No. 10,558,535, which is a (Continued)

(51) Int. Cl.
*G06F 11/20* (2006.01)
*H04L 29/12* (2006.01)
*H04L 29/08* (2006.01)

(52) U.S. Cl.
CPC ........ *G06F 11/203* (2013.01); *H04L 61/6013* (2013.01); *H04L 67/1034* (2013.01); *H04L 61/2007* (2013.01)

(58) Field of Classification Search
CPC .............................. G06F 11/20; G06F 11/203
(Continued)

(56) References Cited

U.S. PATENT DOCUMENTS 6,192,408 B1 2/2001 Vahalia et al.
7,124,171 B1 * 10/2006 McCann ........... H04L 29/12283
709/216

(Continued)

OTHER PUBLICATIONS

Mell et al., "The NIST Definition of Cloud Computing," National Institute of Standards and Technology, Information Technology Laboratory, Version 15, Oct. 7, 2009, 2 pages.

(Continued)

*Primary Examiner* — Kamini B Patel
(74) *Attorney, Agent, or Firm* — Zilka-Kotab, P.C.

(57) ABSTRACT

A computer program product is provided for extending network services addresses, the computer program product comprising a computer readable storage medium having program instructions embodied therewith, where the program instructions are executable by a processor to cause the processor to identify, by the processor, an event affecting a node, wherein the node provides external access to a network using an Internet Protocol (IP) address, in response to identifying the event, identify, by the processor, an attribute associated with the IP address, and based on the attribute associated with the IP address, determine, by the processor, whether to move the IP address to another node.

20 Claims, 7 Drawing Sheets

Related U.S. Application Data continuation of application No. 14/788,740, filed on Jun. 30, 2015, now Pat. No. 9,772,915.

(58) Field of Classification Search
USPC ........................................ 714/4.12
See application file for complete search history.

(56) References Cited

U.S. PATENT DOCUMENTS

| | | | |
|---|---|---|---|
| 7,165,122 B1* | 1/2007 | Sitaraman | H04L 61/2061 709/213 |
| 7,296,068 B1* | 11/2007 | Sarma | G06F 3/061 709/223 |
| 7,657,529 B2* | 2/2010 | Kaura | G06F 16/10 707/782 |
| 7,707,263 B1 | 4/2010 | Cramer et al. | |
| 8,060,773 B1* | 11/2011 | Katkar | G06F 11/1425 714/4.1 |
| 8,185,776 B1* | 5/2012 | Gentes | G06F 11/1438 714/4.11 |
| 8,195,760 B2* | 6/2012 | Lacapra | G06F 16/182 709/214 |
| 8,417,899 B2 | 4/2013 | Roush | |
| 8,522,086 B1* | 8/2013 | Garrett | G06F 11/3006 714/48 |
| 8,539,056 B2 | 9/2013 | Harmelin et al. | |
| 9,772,915 B2* | 9/2017 | Brown | H04L 67/1034 |
| 10,326,702 B2* | 6/2019 | Park | G06Q 50/01 |
| 10,558,535 B2* | 2/2020 | Brown | H04L 61/6013 |
| 2003/0061323 A1* | 3/2003 | East | H04L 41/22 709/223 |
| 2004/0249947 A1 | 12/2004 | Novaes et al. | |
| 2005/0080982 A1 | 4/2005 | Vasilevsky et al. | |
| 2007/0165622 A1 | 7/2007 | O'Rourke et al. | |
| 2008/0222642 A1* | 9/2008 | Kakarla | G06F 9/5077 718/104 |
| 2008/0276304 A1* | 11/2008 | Maffione | H04L 67/1021 726/4 |
| 2009/0063123 A1* | 3/2009 | Buckler | G06F 16/285 703/22 |
| 2009/0132666 A1* | 5/2009 | Rahman | H04L 41/0681 709/206 |
| 2010/0023925 A1* | 1/2010 | Shribman | G06F 40/154 717/110 |
| 2010/0067369 A1 | 3/2010 | Deishi | |
| 2011/0004929 A1* | 1/2011 | Hopkins | G06Q 30/02 726/9 |
| 2011/0029676 A1 | 2/2011 | Detrick et al. | |
| 2011/0154092 A1* | 6/2011 | Dash | H04L 41/0654 714/2 |
| 2011/0179419 A1* | 7/2011 | Gusev | G06F 9/5061 718/100 |
| 2011/0271091 A1* | 11/2011 | Andrews | G06F 11/0754 713/100 |
| 2013/0085802 A1 | 4/2013 | Belady et al. | |
| 2014/0153544 A1 | 6/2014 | Lu et al. | |
| 2015/0006955 A1* | 1/2015 | Russell | G06F 11/0793 714/15 |
| 2015/0074450 A1* | 3/2015 | Blount | G06F 11/0727 714/6.1 |
| 2015/0186666 A1* | 7/2015 | Jacquin | G06F 21/6227 726/29 |
| 2015/0207809 A1* | 7/2015 | Macaulay | G06F 21/552 726/22 |
| 2015/0341376 A1* | 11/2015 | Nandy | H04L 63/1408 726/23 |
| 2017/0004057 A1* | 1/2017 | Brown | H04L 61/6013 |
| 2017/0061006 A1 | 3/2017 | Hildebrand et al. | |
| 2017/0118168 A1* | 4/2017 | Li | H04L 67/36 |
| 2017/0351588 A1* | 12/2017 | Brown | G06F 11/2033 |

OTHER PUBLICATIONS

Mell et al., "The NIST Definition of Cloud Computing: Recommendations of the National Institute of Standards and Technology," National Institute of Standards and Technology, U.S. Department of Commerce, Special Publication 800-145, Sep. 2011, 7 pages.

NIST, "NIST Cloud Computing Program," Informational Webpage, http://www.nist.gov/itl/cloud/, retrieved Dec. 19, 2013, 2 pages.

Brown et al., U.S. Appl. No. 14/788,740, filed Jun. 30, 2015.

Non-Final Office Action from U.S. Appl. No. 14/788,740, dated Dec. 7, 2016.

Notice of Allowance from U.S. Appl. No. 14/788,740, dated May 23, 2017.

Brown et al., U.S. Appl. No. 15/683,629, filed Aug. 22, 2017.

Non-Final Office Action from U.S. Appl. No. 15/683,629, dated Dec. 31, 2018.

Final Office Action from U.S. Appl. No. 15/683,629, dated Jul. 12, 2019.

Notice of Allowance from U.S. Appl. No. 15/683,629, dated Oct. 1, 2019.

List of IBM Patents or Patent Applications Treated As Related.

Supplemental Notice of Allowance from U.S. Appl. No. 15/683,629, dated Jan. 16, 2020.

* cited by examiner

--Prior Art--

--Prior Art--

```
[root@nod1]#  gpces address list

Node    Daemon Node Name        IP Address      External  IP Address List
─────────────────────────────────────────────────────────────────────────
1       nod1.labs.ibm.com       1.2.3.4         5.6.7.2   6.7.8.6(attribute1)
2       nod2.labs.ibm.com       1.2.3.5         5.6.7.1   6.7.8.5(attribute2)
3       nod3.labs.ibm.com       1.2.3.6         5.6.7.3   6.7.8.7(attribute3)
4       nod4.labs.ibm.com       1.2.3.7         5.6.7.4   6.7.8.9(attribute4)
[root@nod1]#
```

FIG. 6

```
[root@nod1]#  gpces address add --external-ip 6.7.8.6 --attribute attribute1

[root@nod1]#  gpces address add --external-ip 6.7.8.5 --attribute attribute2

[root@nod1]#  gpces address add --external-ip 6.7.8.7 --attribute attribute3

[root@nod1]#  gpces address add --external-ip 6.7.8.9 --attribute attribute4

[root@nod1]#  gpces address remove --external-ip 6.7.8.3,6.7.8.4

[root@nod1]#  ▯
```

FIG. 7

CLUSTER FILE SYSTEM SUPPORT FOR EXTENDED NETWORK SERVICE ADDRESSES

BACKGROUND

The present invention relates to clustered file systems, and more particularly, this invention relates to the use of address attributes in cloud storage systems and networks.

Clustered file systems provide a powerful homogenous view and access to diverse sources of storage. However, a major drawback to these systems is that the easiest and most direct method for a user to access the file system data is from a node that is a direct member of the file system cluster. To relax this constraint, services have been implemented on top of clustered file systems that export or externalize the clustered file system data. An example of this is Network File System (NFS) and Server Message Block (SMB) services, which may export the clustered file system. Users may then access the data from any computer system implementing these ubiquitous protocols.

Typically, this service export is associated with the concept of network service addresses. Clients to the external services connect to the clustered file system and the services running on the clustered file system through these network addresses. In most cases, the clients are unaware that they are connected to a cluster. In this environment, high-availability is ensured by implementing these service addresses as aliases attached to physical or virtual adapters. More than one node of the cluster is configured to support the network addresses. In the event that a cluster node currently configured with an address alias fails, then that address is moved to a healthy node. Clients detect this movement and either directly, or transparently, reconnect to the healthy cluster node through the same network address.

BRIEF SUMMARY

In one general embodiment, a computer program product is provided for extending network services addresses, the computer program product comprising a computer readable storage medium having program instructions embodied therewith, where the program instructions are executable by a processor to cause the processor to identify, by the processor, an event affecting a node, wherein the node provides external access to a network using an Internet Protocol (IP) address, in response to identifying the event, identify, by the processor, an attribute associated with the IP address, and based on the attribute associated with the IP address, determine, by the processor, whether to move the IP address to another node.

In another general embodiment, a computer program product is provided for extending network services addresses, the computer program product comprising a computer readable storage medium having program instructions embodied therewith, where the program instructions are executable by a processor to cause the processor to define, by the processor, a network address attribute, and associate, by the processor, the network address attribute with an Internet Protocol (IP) address of a node that provides at least one external service, such that the node provides the at least one external service at the IP address in accordance with the network address attribute.

In yet another general embodiment, a system is provided, the system comprising a processor, and logic integrated with the processor, executable by the processor, or integrated with and executable by the processor, where the logic is configured to identify an event affecting a node, wherein the node provides external access to a network using an Internet Protocol (IP) address, in response to identifying the event, identify an attribute associated with the IP address, and based on the attribute associated with the IP address, determine whether to move the IP address to another node.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 6 illustrates a command line interface providing output regarding a clustered file system wherein attributes are assigned to network addresses, according to one embodiment.

FIG. 7 illustrates a command line interface for managing network addresses and attributes, according to one embodiment.

DETAILED DESCRIPTION

Figure 1:
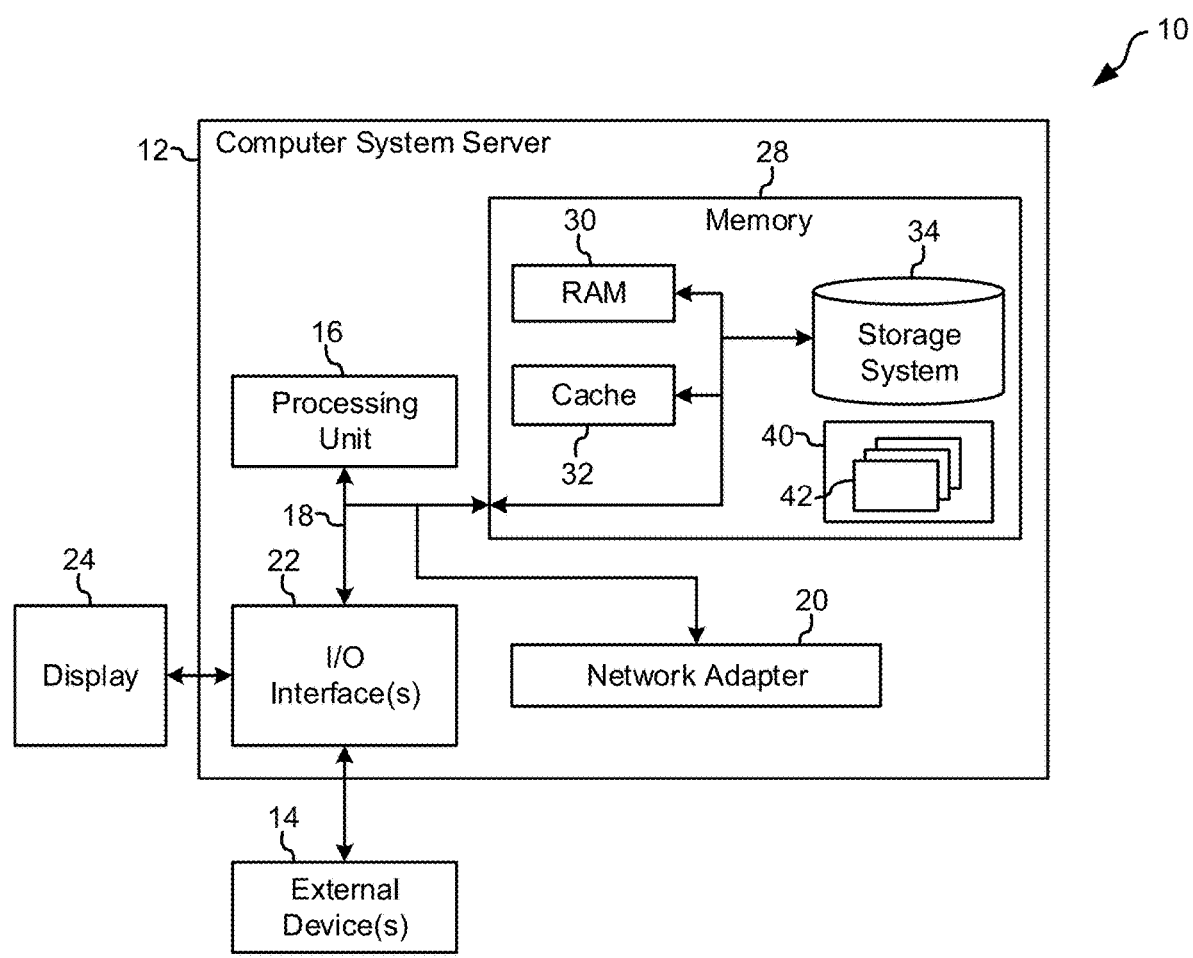
FIG. 1 depicts a cloud computing node according to an embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments for extending network service addresses.

In one general embodiment, a computer program product is provided for extending network services addresses, the computer program product comprising a computer readable storage medium having program instructions embodied therewith, the program instructions executable by a processor to cause the processor to identify a network event affecting a node of a sub-cluster of nodes of a network, wherein the node provides external access to the network using an Internet Protocol (IP) address. The program instructions are also executable by the processor to cause the processor to, in response to identifying the network event, identify an attribute associated with the IP address of the node. Finally, the program instructions are executable by the processor to cause the processor to, based on the attribute associated with the IP address of the node, determine whether to move the IP address of the node to another node of the sub-cluster.

In another general embodiment, a computer program product is provided for extending network services addresses, the computer program product comprising a computer readable storage medium having program instructions embodied therewith, the program instructions executable by a processor to cause the processor to group at least two nodes of a clustered file system into a sub-cluster, wherein each node in the sub-cluster provides at least one external service. The program instructions executable by the processor also cause the processor to define a network address attribute. Finally, the program instructions executable by the processor cause the processor to associate the network address attribute with an Internet Protocol (IP) address of one of the nodes of the sub-cluster, such that the one of the nodes of the sub-cluster provides the at least one external service at the IP address in accordance with the network address attribute.

In yet another general embodiment, a system is provided, the system comprising a processor and logic integrated with and/or executable by the processor, the logic configured to identify a network event affecting a node of a sub-cluster of nodes of a network, wherein the node provides external access to the network using an Internet Protocol (IP) address. The logic is further configured to, in response to identifying the network event, identify an attribute associated with the IP address of the node. The logic is also configured to, based on the attribute associated with the IP address of the node, determine whether to move the IP address of the node to another node of the sub-cluster.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
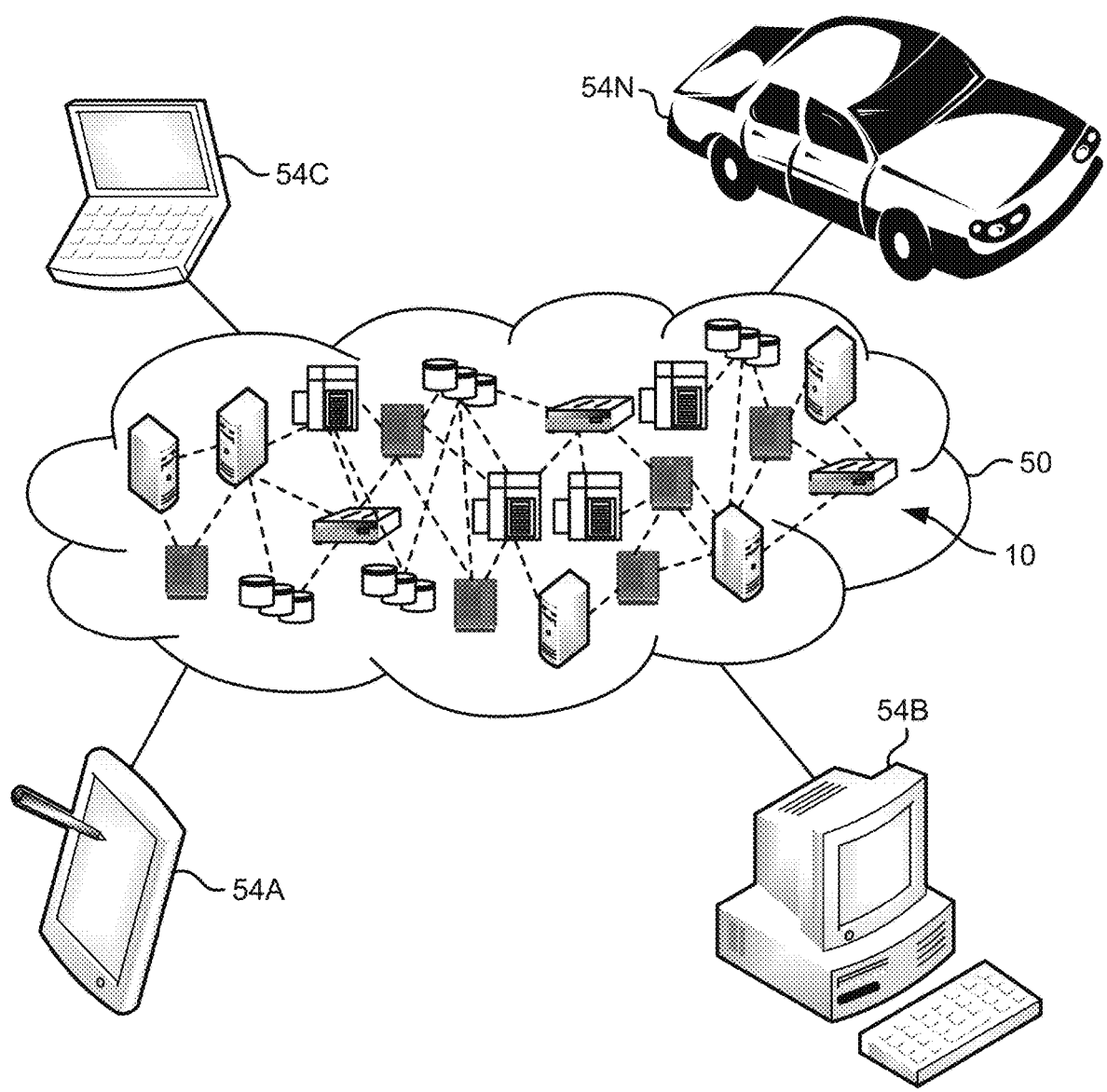
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
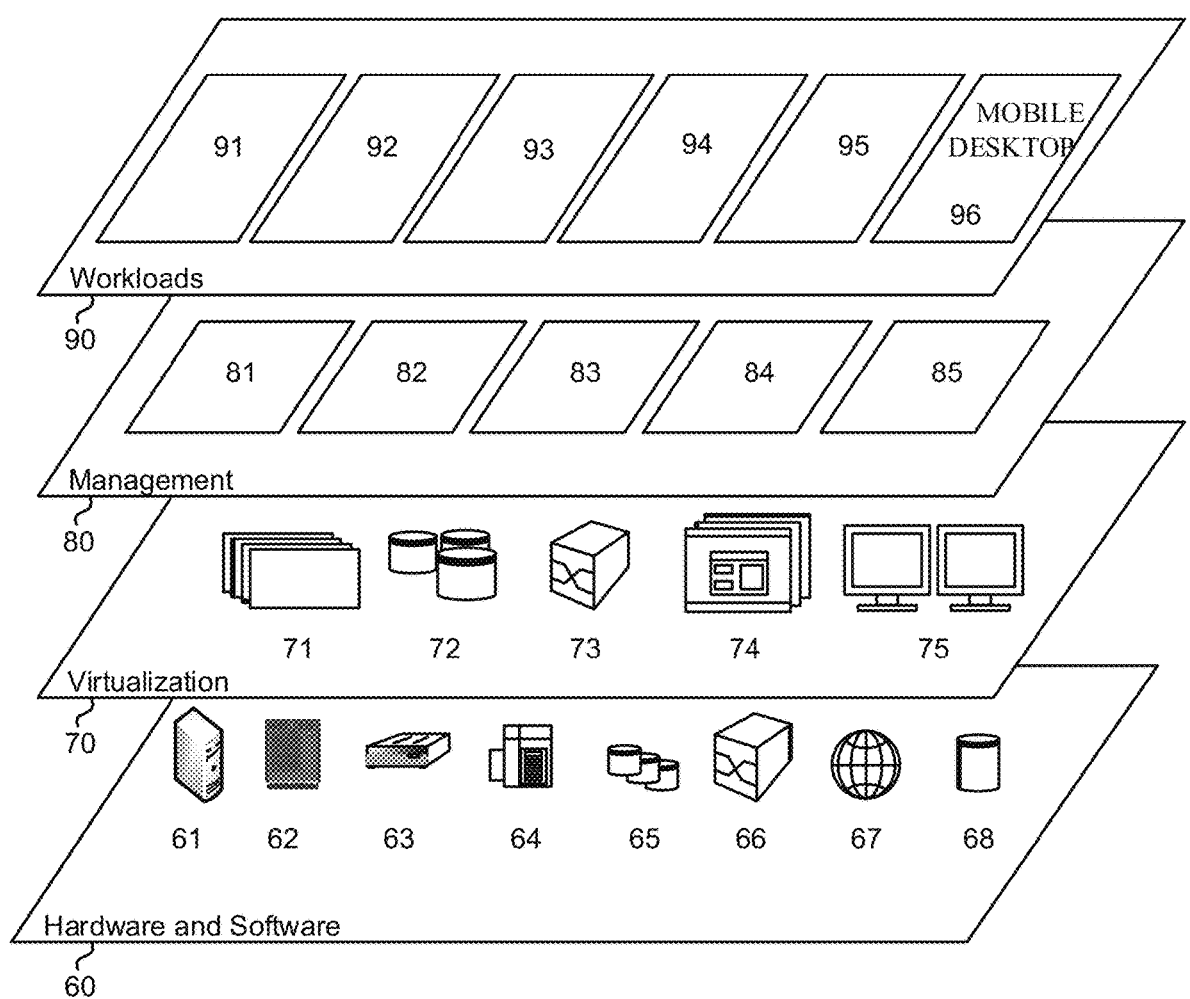
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

The management layer 80 may also provide functionality for managing IP addresses, implementing and managing IP address attributes, and utilizing the IP address attributes when responding to network events.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Figure 4:
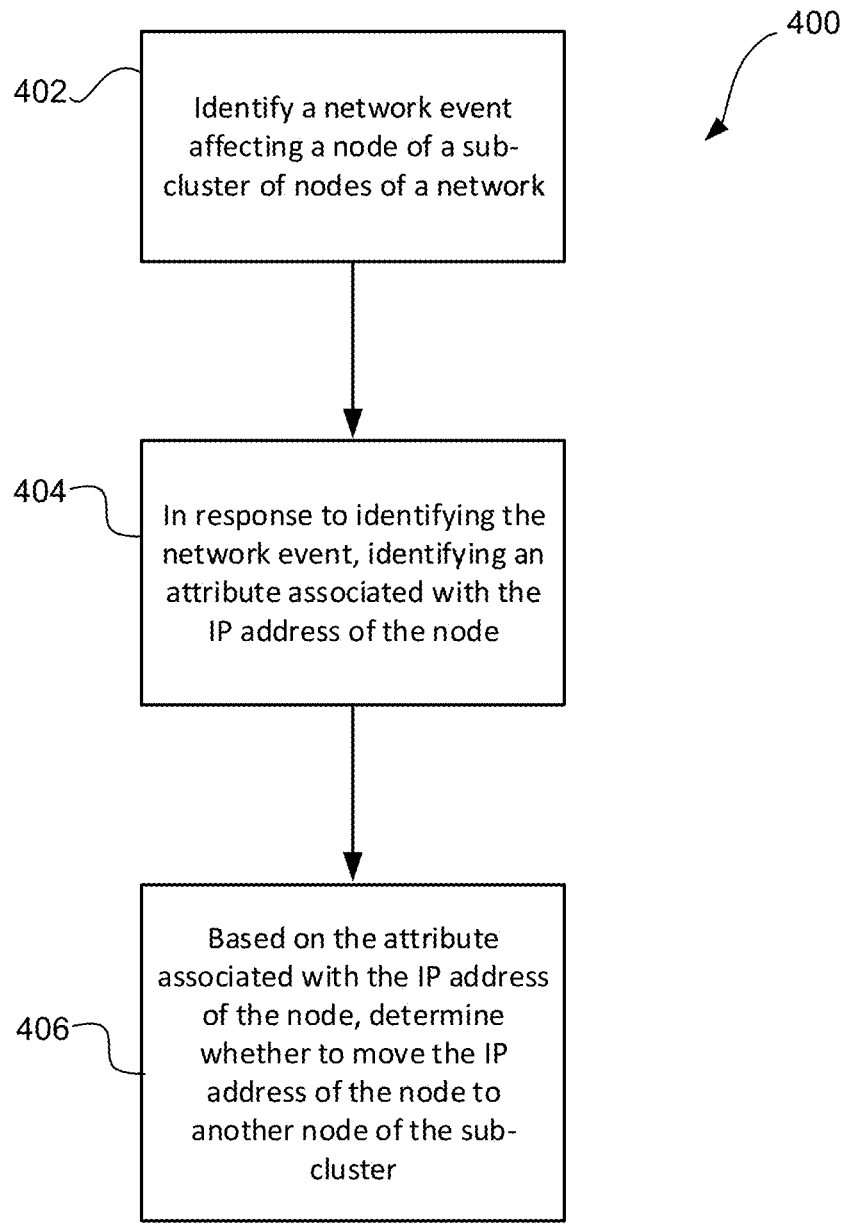
FIG. 4 illustrates a method for providing clustered file system support for extended network service addresses, in accordance with one embodiment.

Now referring to FIG. 4, a flowchart of a method 400, for providing clustered file system support for extended network service addresses, is shown according to one embodiment. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a data server or user device, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

At operation 402, a network event is identified. Further, the identified network event affects a node of a sub-cluster of a cluster of nodes of a network. Moreover, the affected node may provide external access to a clustered file system of the network using an Internet Protocol (IP) address. In other words, external clients may connect to the IP address for read/write access to the clustered file system hosted on the cluster of nodes. A clustered file system may include any file system that is simultaneously mounted by multiple services and/or nodes. Examples of commercial clustered file systems include: Lustre, Oracle Cluster File System, Veritas Cluster File System, and GlusterFS (Linux). Additionally, the Cluster Trivial Data Base component of Samba also employs network service addresses for fail over.

In one embodiment, the cluster may include servers that offer services to clients, and the clients access the services by connecting to one or more IP addresses that are exported by nodes of the cluster. In such an embodiment, the clients may not connect to the servers themselves, but instead the clients connect to nodes delegated to manage incoming connections for the servers.

In various embodiments, it may be determined which nodes of a cluster are capable of supporting external services and exporting IP addresses for external access by various clients. As used herein, an exported IP address may be any address that is made accessible to clients by a node so that the clients may, through the IP address, access resources of the cluster. For example, an exported IP address may be an IP address that a client may connect to over the Internet for accessing resources of the cluster. In a given configuration, a cluster may include only one node that is capable of supporting external services and exporting IP addresses. In another configuration, all of a plurality of nodes of a cluster may be capable of supporting external services and exporting IP addresses. The nodes of the cluster that are capable of supporting external services and exporting IP addresses may be logically defined as a sub-cluster, and the nodes of the sub-cluster may export the IP addresses for connection by various clients.

As an example, in a given four-node cluster, if two of the nodes are capable of supporting external services and exporting IP addresses, then those two nodes may be defined as a sub-cluster. Further, an application programming interface (API) may be provided to allow a user to assign the IP addresses to the nodes, as well as to assign attributes to the IP addresses, as discussed below.

The clients may include Network File System (NFS) clients, Server Message Block (SMB) clients, open stack clients, etc., that connect to the respective service offered by the node at the IP address. For example, a SMB client may connect to the IP address for read/write access of the clustered file system using a SMB service of the node.

In one embodiment, each of the nodes of a given sub-cluster may provide the same external services to any clients that are connected to its external IP addresses. For example, a first one of the nodes of a sub-cluster may provide SMB service, and a second node of the sub-cluster may also provide SMB service. Further, the clients of such an embodiment may not care about which address or which node of the sub-cluster they are connected to for using the SMB service. Because of this, addresses may be configured uniformly in the cluster. Accordingly, when one of the nodes experiences a failure condition in such an embodiment, the node may be replaced by another one of the nodes of the sub-cluster in order to continue providing external services to connected clients.

A given node of a sub-cluster may replace another node of the sub-cluster by moving one or more exported IP addresses to the given node from the node it is replacing. As a result, a client connected at one of the IP addresses may follow its connection as the address is moved in the sub-cluster. IP addresses may be moved between nodes to ensure high availability, as well as for load balancing purposes when the load on one or more nodes exceeds a threshold. For example, if a node fails, then the external IP addresses of the node may be moved to one or more non-failed nodes, and clients may continue to access the clustered file system at the external IP addresses via the one or more non-failed nodes. As another example, if a node provides SMB and NFS services at two or more external IP addresses, and the node is overloaded, then one of the external IP addresses may be moved to another node to continue providing the respective service to the respective clients, while reducing the load on the node.

In another embodiment, each of the nodes of a sub-cluster may provide different external services to clients that are connected to its external IP addresses. For example, a first one of the nodes of a sub-cluster may provide SMB service, and a second node of the sub-cluster may provide NFS service. In such an embodiment, if the first one of the nodes of the sub-cluster were to fail, the second node of the sub-cluster may not adequately replace the failed node because the second node of the sub-cluster does not provide the SMB service being utilized by the failed node's connected clients.

In one embodiment, the network event identified at operation 402 may include the failure of a node. In another embodiment, the network event may include a failure of an aspect of the network, such as an interconnect between the node and another entity, such as a path, switch, router, gateway, etc. In yet another embodiment, the network event may include a heavy load. For example, the node of the sub-cluster could experience a load that exceeds a pre-defined threshold. The load may exceed the threshold due to the number of clients connected, processor workload, bandwidth, etc.

At operation 404, in response to identifying the network event, an attribute associated with the IP address of the node is identified. The attribute may include any value stored in association with, or assigned to, the IP address that is utilized to determine a response to the network event. For example, an action or response of a management application to a circumstance that affects the IP address may be determined using the attribute.

As used herein, a management application may include any code that evaluates one or more attributes associated with an IP address to make a determination regarding a location of the IP address. For example, the management application may include failover code that is triggered in response to the failure of a node or network. As another example, the management application may include load balancing code that is triggered when a load on a node reaches or exceeds a threshold, and the load balancing code is responsible for balancing the loads amongst nodes of a cluster or sub-cluster. Thus, one or more management applications of a clustered file system may be responsible for assigning external IP addresses, and moving these IP addresses between nodes in response to network outages, failures, and loads.

Next, at operation 406, based on the attribute associated with the IP address of the node, it is determined whether to move the IP address of the node to another node of the sub-cluster. The movement of the IP address to another node of the sub-cluster may or may not be prevented by the attribute assigned to the IP address.

In one embodiment, a static attribute may indicate that an associated address should not be moved under any circumstance. In other words, the static attribute may indicate that the associated IP address cannot be moved from the node that currently exports the IP address. For example, if a given node is providing external services to clients at a given IP address assigned with a static attribute, and that node were to fail, then the management application would be prevented from moving the address to another node due to the static attribute. Thus, if the static attribute is identified at operation 404, then any movement of the IP address is prevented.

As a consequence of the static attribute, any client connected to an exported IP address that is assigned the static attribute may be disconnected from the clustered file system in the event of a failure of the node hosting the IP address. As a result, the client's access to the service may be interrupted. In some embodiments, another address may be utilized by the client, in place of the address of the failed node, so that the client may continue to access the clustered file system via a different node.

In this way, the static attribute may be utilized by a service that has added an external IP address to a network pool for a specific purpose, and does not want the IP address moved to another node in the event of a failure. Assignment of a static attribute to an IP address may also prevent movement of the IP address during a reboot operation.

In another embodiment, a sticky attribute may indicate that an associated address should not be moved for load balancing purposes. In other words, an IP address assigned the sticky attribute will not be moved for load balancing reasons. Thus, if the sticky attribute is identified at operation 404, then movement of the IP address to a new node may be allowed if the network event affecting the node is a failure of the node. However, if the sticky attribute is identified at operation 404, and the network event affecting the node is a heavy load, then movement of the IP address will be prevented. Consequently, the management application may be forced to move other addresses that are not associated with the sticky attribute, or to allow the heavy load to persist on the node.

In a specific example, where a first node is assigned a first two external IP addresses, and a second node is assigned a second two external IP addresses, if a load on one of the two nodes is greater than a load on the other of the nodes by a predetermined threshold, then monitoring software may determine to move at least one of the external IP addresses from the more heavily loaded node. In other words, monitoring software may attempt to balance the load between nodes in a sub-cluster. However, if all of the external IP addresses have been assigned a sticky attribute, then none of the external addresses may be available for movement for load balancing purposes. Accordingly, the monitoring software may identify and evaluate the attributes of the externally served IP addresses of the nodes before attempting any load balancing operation. In the event that the monitoring software identifies an over-loaded node serving an external IP address that may be moved for load balancing reasons, then the monitoring software may move the external IP address to another node of the sub-cluster.

The sticky attribute may be associated with an IP address when it is costly or difficult to re-establish on a different node the services offered at the IP address. Thus, the IP address should only be moved to a different node in the event of a failure of the currently exporting node.

Any client connected to a service at an exported IP address when the IP address is moved from a first node to a second node may continue accessing the clustered file system at the connected address via the second node without any service interruption. In other words, the clients may be moved with the address. Further, because access of the clients to the clustered file system is node independent, movement of the IP address between nodes may be transparent to the external clients connected to the clustered file system at the IP address.

In another embodiment, an affinity attribute may indicate that an associated address has a preference for a particular node. In other words, the affinity attribute may indicate that the IP address it is assigned to should, when possible, be exported by non-preferred nodes. For example, if a first node is providing external services to clients at a given IP address assigned an affinity attribute, and the first node were to experience a heavy load under which addresses are typically moved off the first node to other nodes, then the management application may identify that the affinity attribute indicates an affinity of the given IP address for a second node. Thus, as a result, the given IP address may be moved to the second node in order to satisfy the affinity attribute assigned to the IP address, and to reduce the load on the first node.

The affinity attribute may be assigned to an IP address when the IP address should be, by default, associated with a particular node for various reasons. For example, if the IP address provides a unique service, and it makes sense for all clients using the unique service to connect to a particular node for reasons associated with geography or resource utilization, then the IP address may be assigned an affinity attribute that identifies an affinity for the particular node. This may ensure that the external IP address is always exported by the particular node unless the node has failed or otherwise experiences reduced availability. In this manner, clients that utilize the unique service may be funneled to the particular node. Affinity attributes may be evaluated on a regular basis (e.g., every n seconds, n minutes, etc.), independent of network failures/outages, to ensure that the affinity attributes are, when possible, satisfied.

In accordance with the above description, a clustered file system may monitor and maintain (e.g., start, stop, etc.) external network IP addresses. Further, clustered file system code may honor attributes assigned to the network IP addresses when responding to events such as node failure, network failure, and/or heavy load. Accordingly, these assigned attributes may control how the IP addresses are moved from node to node in response to different events affecting the cluster.

Figure 5:
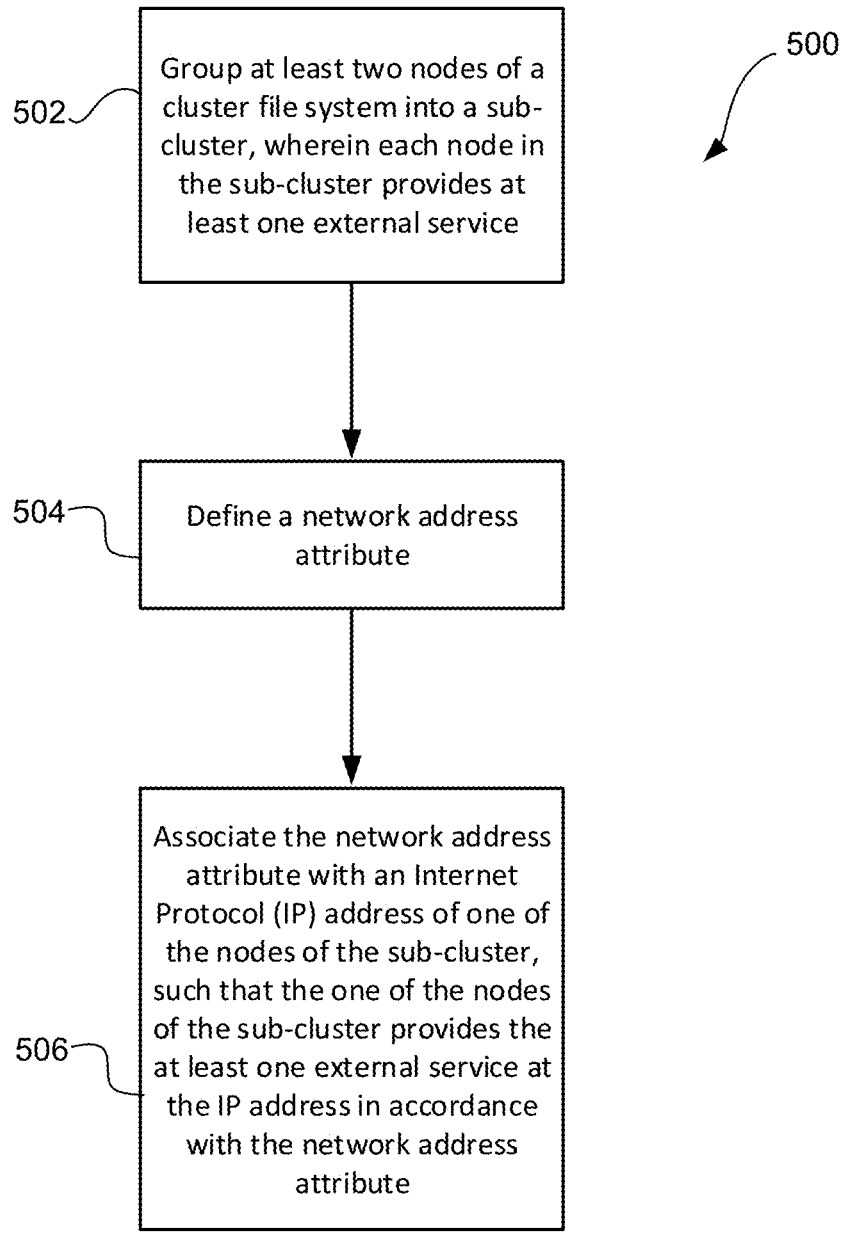
FIG. 5 illustrates a method for providing clustered file system support for extended network service addresses, in accordance with another embodiment.

Now referring to FIG. 5, a flowchart of a method 500, for providing clustered file system support for extended network service addresses, is shown according to one embodiment. The method 500 may be performed in accordance with the present invention in any of the environments depicted in FIGS. 1-3, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a data server or user device, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in operation 502, at least two nodes of a clustered file system are grouped into a sub-cluster. Further, each of the nodes in the sub-cluster provides at least one external service. Accordingly, the sub-cluster may be logically defined to include clustered file system nodes that have external network access.

In addition, at operation 504, a network address attribute is defined. Defining a network address attribute includes any action that enables a management application to identify the network address attribute, and then operate in a predefined manner on an IP address assigned the attribute.

In various embodiments, more than one network address attribute may be defined. As noted above, the network address attribute may include an attribute to prevent movement of an IP address between nodes under any circumstance, such as a static attribute. Still yet, the network address attribute may include an attribute to prevent movement of an IP address between nodes due to load balancing operations, such as a sticky attribute. Of course, the attribute defined at operation 504 may include any of the attributes discussed above in the context of FIG. 4.

In yet another embodiment, a multicast attribute may indicate that an associated address is a multicast address. In such an embodiment, the multicast attribute may ensure that multicast IP addresses are only exported by specific nodes.

In one embodiment, each IP address may be associated with a protocol attribute that indicates protocols or services available at the IP address. In other words, for an IP address that is being exported by a node, a protocol attribute assigned to the IP address may indicate the services available to clients using the IP address. For example, a protocol attribute assigned to an IP address exported by a given node may indicate that SMB is being used by clients attached to the node at that address. Moreover, the protocol attribute may be updated dynamically, in response to clients connecting. For example, in response to a first client connecting at the IP address and accessing a clustered file system using SMB, the assigned protocol attribute may be updated to reflect usage of SMB. Accordingly, if the node were to fail, a management application may determine, using the protocol attribute, that the IP address should be moved to another node that is already supporting access to the clustered file system using SMB.

Similarly, if the node were to fail while exporting an IP address that is assigned a protocol attribute indicating the connection of both SMB and NFS clients, then the management application may determine that the IP address should be moved to another node that is already supporting access to the clustered file system using both SMB and NFS. In this manner, the external IP addresses of failed nodes may be reliably moved to non-failing nodes that fully support the services used by the clients of the failing node.

In another embodiment, the protocol attribute associated with an exported IP address may not be dynamically updated based on connected clients, but may instead be static. In other words, the protocol attribute assigned to an exported IP address may indicate that only a limited sub-set of services are available at the IP address (e.g., only SMB, only NFS, etc.). A management application may utilize the protocol attribute of a given IP address to determine which other IP addresses being exported by other nodes of the cluster also make available the same services.

The management application may need to make such a determination when a node has failed, and one or more IP addresses exported by the failing node may not be moved to non-failing nodes. Thus the management application may need to identify new IP addresses supporting the services utilized by the clients of the failing node. For example, if SMB service is not active on all nodes of a clustered file system, and a node that is exporting IP addresses for usage by SMB clients fails, then the protocol attribute may enable quick identification of one or more other external IP addresses on other nodes that support SMB clients. Accordingly, the protocol attribute may make it such that it is not necessary to activate all services on all nodes of a clustered file system, and thereby preserve system resources.

In one embodiment, an activation attribute may indicate that an associated IP address should only be exported when one or more particular nodes are active. In other words, an activation attribute may be assigned to an IP address for limiting the exportation of the IP address to only when the one or more particular nodes are active. As a result, the IP address may only be exported and made available to external clients when the one or more particular nodes are operational. The activation attribute may be employed where aspects of an executing application require a specific node presence and/or node configuration. For example, where the executing application requires resources only available between a limited sub-set of nodes. When the specific node presence and/or node configuration is not present, then the executing application and/or the clients connected at the exported IP address may experience errors. Accordingly, to avoid wasting resources, the IP address is not made available to external clients unless the one or more particular nodes identified by an assigned activation attribute are enabled.

In various embodiments, the attributes associated with the external IP addresses of the nodes may be stored in a repository. For example, each external IP address may be stored in the repository in association with any attribute(s) that it has been assigned. As an option, the attributes may be stored in a table or database of the repository. Further, the attributes may be stored as one or more text strings.

Next, at operation 506, the attribute is associated with an IP address of one of the nodes of the sub-cluster. Based on the association of the attribute with the IP address of the node, the node of the sub-cluster provides the at least one external service at the IP address in accordance with the attribute. In various embodiments, associating the network address attribute with the IP address includes assigning the attribute to the IP address.

In one embodiment, commands may be implemented to allow users to add, delete, and/or move IP addresses to a sub-cluster pool. Further, commands may allow users to add, delete, and/or move an IP address to/from a particular node. Commands may also allow users to manually assign one or more attributes to an IP address. The IP address may be exported by a node for external access by one or more clients.

In one embodiment, clustered file system code may be modified to dynamically set network address attributes, such as an affinity attribute for a specific service, such as SMB or NFS.

In some embodiments, a clustered file system may be responsible for assigning and failing-over exported IP addresses between nodes of the sub-cluster grouped at operation 502. The clustered file system may assign and fail-over the IP addresses in response to network events, such as node failure, network failure, and heavy load. Accordingly, the clustered file system may be configured to assign and fail-over the IP addresses in accordance with the network address attributes assigned to the IP addresses.

Thus, a list of one or more attributes may be assigned to each of the external IP addresses. These attributes may be assigned statically and/or dynamically, and control the behavior of a clustered file system in the event of failures or other events.

As noted above, in various embodiments, a cluster may include one or more nodes that provide access to a clustered file system, and the cluster may implement service address pools. The clustered file system may allow management and monitoring of the addresses in the pools, in addition to recovery methods. More than one node of a cluster may be configured to support the network addresses. In the event that a cluster node currently configured with an address alias fails, then that address may be moved to a healthy node. Clients may detect this movement and either directly, or transparently, reconnect to the healthy cluster node through the same network address. However, some services may wish to add addresses to a network pool for network management, and do not want, in the event of a failure, the addresses to be moved to other nodes in the cluster. The methods described hereinabove may enable the customized configuration of cluster management and monitoring in accordance with such preferences.

FIG. 6 depicts a command line interface 600 providing output regarding a clustered file system wherein attributes are assigned to network addresses, according to one embodiment. As an option, the present command line interface 600 may be implemented in conjunction with features from any other embodiment listed herein, such as those described with reference to the other FIGS. Of course, however, such command line interface 600 and others presented herein may be used in various applications and/or in permutations which may or may not be specifically described in the illustrative embodiments listed herein. Further, the command line interface 600 presented herein may be used in any desired environment.

As shown in the command line interface 600, a user has requested, for a clustered file system, a list of addresses and associated attributes of the nodes of the clustered file system. In response, the command line interface 600 has provided output that indicates the configuration of four nodes (1-4), as well as a name for each of the nodes. The command line interface 600 output has provided an IP address for accessing each of the four nodes from an internal network of the clustered file system. Moreover, for each of the four nodes, the command line interface 600 has listed one or more IP addresses that the node is exporting for access by external clients, and any attribute assigned to each of the exported IP addresses.

Specifically, the command line interface 600 shows that Node 1 is exporting two external IP addresses, 5.6.7.2 and 6.7.8.6, and further shows that external IP address 6.7.8.6 has been assigned attribute1. The command line interface 600 also shows that Node 2 is exporting two external IP addresses, 5.6.7.1 and 6.7.8.5, and further shows that external IP address 6.7.8.5 has been assigned attribute2. Additionally, the command line interface 600 shows that Node 3 is exporting two external IP addresses, 5.6.7.3 and 6.7.8.7, and further shows that external IP address 6.7.8.7 has been assigned attribute3. Finally, the command line interface 600 shows that Node 4 is exporting two external IP addresses, 5.6.7.4 and 6.7.8.9, and further shows that external IP address 6.7.8.9 has been assigned attribute4.

Each of attribute1, attribute2, attribute3, and attribute4 may include any of the attributes discussed above in the context of FIGS. 4-5, such as, without limitation, the sticky attribute, the static attribute, the affinity attribute, the protocol attribute, etc.

Accordingly, one or more management applications may utilize the assignment of attribute1, attribute2, attribute3, and attribute4 to Node 1, Node, 2, Node 3, and Node 4, respectively, when managing the nodes, such as when determining whether to move the external IP addresses between the nodes in response to network events, such as node failures, network failures, and heavy loads.

While each of Node 1, Node, 2, Node 3, and Node 4 are shown in FIG. 6 to be respectively exporting only one IP address that is assigned an attribute, it is contemplated that more than one address (i.e., a range of addresses) may be assigned a single attribute. For example, all addresses being exported by a node may be assigned a given attribute. It is also contemplated that different IP addresses being exported by a given node may be assigned different attributes. For example, a first IP address being exported by Node 1 may be assigned a first attribute, and a second IP address being exported by Node 1 may be assigned a second attribute different than the first attribute.

Additionally, where the attributes do not conflict, an external IP address may be assigned more than one attribute. For example, a given node may export an IP address that has been assigned each of a sticky attribute (i.e., to prevent movement of the IP address to other nodes except for during a failover condition) and a protocol attribute (i.e., to aid in tracking the services being utilized by clients connected at the IP address).

FIG. 7 illustrates a command line interface 700 for managing network addresses and attributes, according to one embodiment. As an option, the present command line interface 700 may be implemented in conjunction with features from any other embodiment listed herein, such as those described with reference to the other FIGS. Of course, however, such command line interface 700 and others presented herein may be used in various applications and/or in permutations which may or may not be specifically described in the illustrative embodiments listed herein. Further, the command line interface 700 presented herein may be used in any desired environment.

As shown in the command line interface 700, a user may add external IP addresses to a network pool, and further may remove external IP addresses from the network pool. Also shown in the command line interface 700, the user may assign attributes to one or more of the external IP addresses.

As shown in the command line interface 700, specifically, the user has added external IP address 6.7.8.6 to the pool of external IP addresses, and at the same time assigned attribute1 to the IP address. Also, the user has added external IP address 6.7.8.5 to the pool of external IP addresses, and at the same time assigned attribute2 to the IP address. Additionally, the user has added external IP address 6.7.8.7 to the pool of external IP addresses, and at the same time assigned attribute3 to the IP address. Moreover, the user has added external IP address 6.7.8.9 to the pool of external IP addresses, and at the same time assigned attribute4 to the IP address. Finally, the user has removed external IP addresses 6.7.8.3 and 6.7.8.4 from the pool of external IP addresses. As a result, the clustered file system otherwise available at the active external addresses may no longer be accessed by clients using the IP addresses 6.7.8.3 and 6.7.8.4.

In this way, a user, such as an administrator, may add one or more addresses to a pool of external IP addresses. Further, although not shown, the user may further assign the external IP addresses to particular nodes of a sub-cluster that are eligible to export services to external clients. Through use of the command line interface, the user may dynamically configure the external IP addresses, and their assigned attributes, at any time.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product for extending network services addresses, the computer program product comprising a computer readable storage medium having program instructions embodied therewith, the program instructions executable by a processor to cause the processor to:
   identify, by the processor, an event affecting a node, wherein the node provides external access to a network using an Internet Protocol (IP) address;
   in response to identifying the event, identify, by the processor, an attribute associated with the IP address; and
   based on the attribute associated with the IP address, determine, by the processor, whether to move the IP address to another node.

2. The computer program product as recited in claim 1, wherein the attribute is assigned to the IP address.

3. The computer program product as recited in claim 2, wherein the event includes a failure of the node.

4. The computer program product as recited in claim 3, wherein the attribute includes a static attribute assigned to the IP address, the static attribute preventing movement of the IP address to the other node in response to the failure of the node.

5. The computer program product as recited in claim 3, wherein the attribute includes a sticky attribute assigned to the IP address that prevents movement of the IP address to the other node in response to a load on the node exceeding a threshold.

6. The computer program product as recited in claim 5, wherein the IP address assigned the sticky attribute is moved to the other node in response to the failure of the node.

7. The computer program product as recited in claim 2, wherein the event includes a load on the node exceeding a threshold.

8. The computer program product as recited in claim 7, wherein the attribute includes a static attribute assigned to the IP address, the static attribute preventing movement of the IP address to the other node in response to the load on the node exceeding the threshold.

9. The computer program product as recited in claim 7, wherein the attribute includes a sticky attribute assigned to the IP address, the sticky attribute preventing movement of the IP address to the other node in response to the load on the node exceeding the threshold.

10. A computer program product for extending network services addresses, the computer program product comprising a computer readable storage medium having program instructions embodied therewith, the program instructions executable by a processor to cause the processor to:
define, by the processor, a network address attribute; and
associate, by the processor, the network address attribute with an Internet Protocol (IP) address of a node that provides at least one external service, such that the node provides the at least one external service at the IP address in accordance with the network address attribute.

11. The computer program product as recited in claim 10, wherein the IP address is exported by the node, and the network address attribute is assigned to the IP address of the node.

12. The computer program product as recited in claim 11, wherein the network address attribute includes a static attribute, the static attribute preventing movement of the IP address to another node in response to a failure of the node.

13. The computer program product as recited in claim 11, wherein the network address attribute includes a sticky attribute, the sticky attribute preventing movement of the IP address to another node in response to a load on the node exceeding a threshold.

14. The computer program product as recited in claim 11, wherein the network address attribute includes a protocol attribute, the protocol attribute being updated dynamically in response to one or more clients connecting to the IP address, wherein the protocol attribute indicates at least one protocol of the at least one external service being used by the one or more clients connected to the node at the IP address.

15. The computer program product as recited in claim 11, wherein the network address attribute includes a protocol attribute, the protocol attribute indicating a limited sub-set of external services that is available to one or more clients at the IP address.

16. The computer program product as recited in claim 11, wherein the network address attribute includes an affinity attribute, the affinity attribute indicating an affinity of the IP address for a particular node.

17. The computer program product as recited in claim 11, wherein the network address attribute includes a multicast attribute, the multicast attribute indicating that the IP address is a multicast address.

18. The computer program product as recited in claim 11, wherein the network address attribute includes an activation attribute, the activation attribute limiting exportation of the IP address, by the node, in response to determining that one or more particular nodes are active.

19. A system, comprising:
a processor; and
logic integrated with the processor, executable by the processor, or integrated with and executable by the processor, the logic being configured to:
identify an event affecting a node, wherein the node provides external access to a network using an Internet Protocol (IP) address;
in response to identifying the event, identify an attribute associated with the IP address; and
based on the attribute associated with the IP address, determine whether to move the IP address to another node.

20. The system as recited in claim 19, wherein the attribute includes a static attribute assigned to the IP address, the static attribute preventing movement of the IP address to the other node in response to a failure of the node.

* * * * *